Dec. 6, 1938.   W. J. NELSON ET AL   2,139,513
SPORT SLED
Filed April 12, 1938
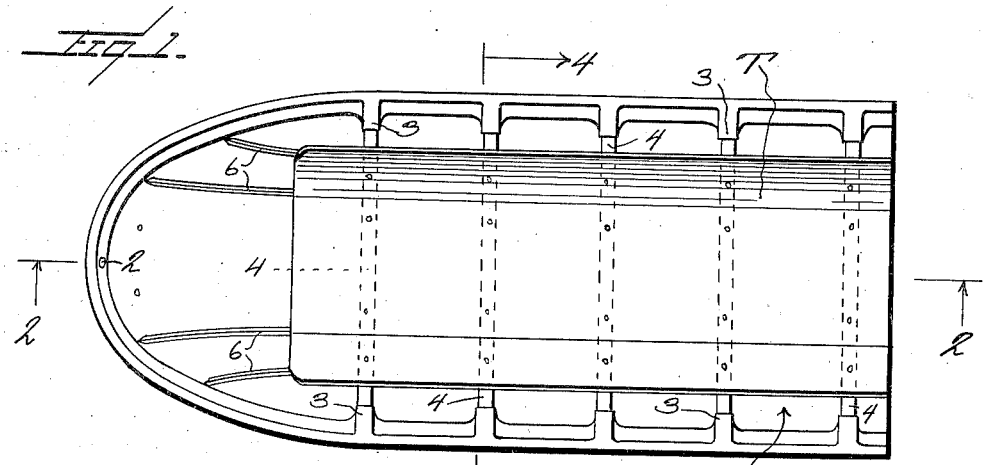
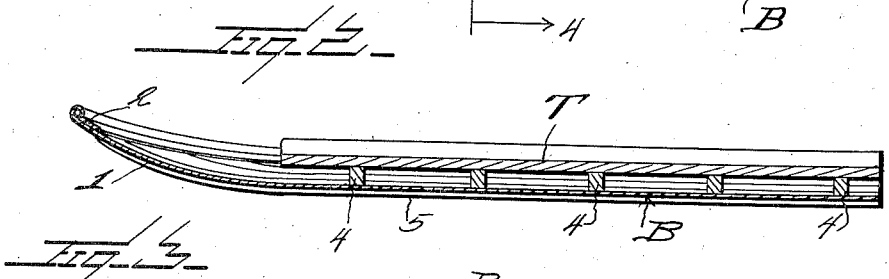
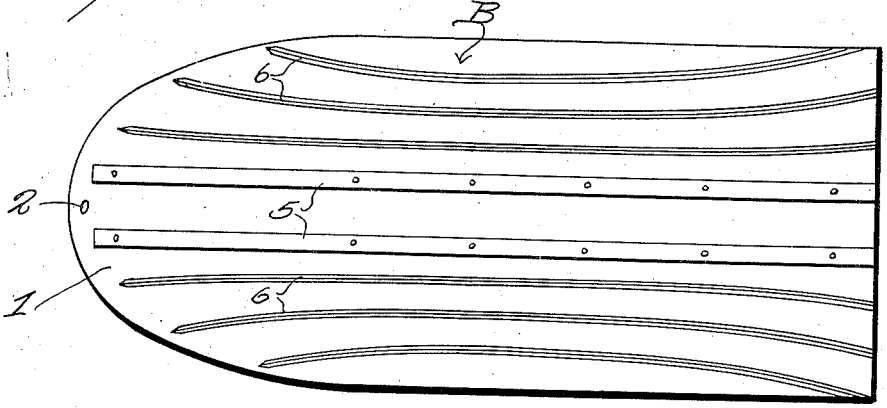
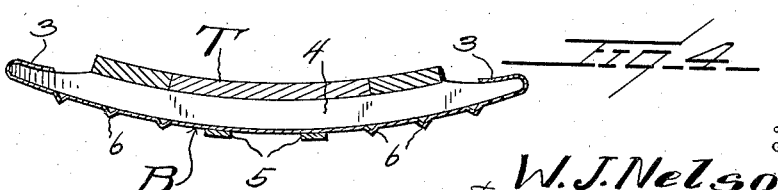
Inventors
W. J. Nelson
E. A. Leiding
By Watson E. Coleman
Attorney Patented Dec. 6, 1938

2,139,513

UNITED STATES PATENT OFFICE 2,139,513

SPORT SLED

William J. Nelson and Elmer A. Leiding,
Orr, Minn.

Application April 12, 1938, Serial No. 201,621

5 Claims. (Cl. 280—18)

This invention relates to a sport sled, and it is an object of the invention to provide a vehicle of this kind constructed and assembled in a manner whereby the desired steering is accomplished by tilting or rocking the sled transversely in either direction when the weight of the person or persons riding the sled is shifted from one side to the other.

It is also an object of the invention to provide a sled of this kind which will work equally well on a hard snow surface or on soft snow.

A further object of the invention is to provide a sled of this kind having the top set low to obtain a low center of gravity to increase stability and substantially eliminate the possibility of the sled turning over when in transit.

The invention consists in the details of construction and in the combination and arrangement of the several parts of our improved sport sled whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawing, wherein:—

Figure 1 is a view in top plan of a sport sled constructed in accordance with an embodiment of our invention;

Figure 2 is a longitudinal sectional view taken substantially on the line 2—2 of Figure 1;

Figure 3 is a view in bottom plan of the sled as illustrated in Figure 1;

Figure 4 is a transverse sectional view taken substantially on the line 4—4 of Figure 1.

As disclosed in the accompanying drawing, our improved sled comprises a bottom plate B of sheet metal and which extends the full length and width of the sled as a unit. This plate B is stamped or otherwise formed to have its forward end portion upwardly and laterally curved to provide a bow portion 1 with said bow portion 1 in top plan substantially semi-elliptical. The plate B is also transversely curved from one side to the other as is particularly illustrated in Figure 4 whereby as a result of the shifting of the load upon the vehicle, such as a person riding thereon, the sled will be transversely rocked in either direction and which movement is of particular importance in steering the sled.

The side and forward marginal portions of the plate B are returned, as at 2, to strengthen the structure of the sled and said returned portions at predetermined points spaced along the side or longitudinal margins of the plate B are formed to provide the inwardly opening saddle members 3 each substantially in the form of an inverted U. These saddle members 3 coact with the adjacent portions of the plate B therebelow to provide sockets which snugly receive the opposite extremities of the transversely disposed cleats or sills 4. The upper faces of these cleats or sills 4 are disposed on a curvature substantially concentric to the transverse curvature of the plate B. These cleats or sills 4 have secured thereto the top or seat T which may be of wood or other desired material. As herein disclosed, this top or seat T has its upper surface curved substantially similar to the curvature of the plate B.

It is to be particularly noted that the cleats or sills 4 are of a size to have the top or seat T set low in order to obtain a low center of gravity to increase stability and to substantially eliminate the possibility of the sled as a unit turning over when in use.

Secured along the under surface of the plate B from the rear thereof to a point in close proximity to the free extremity of the bow portion 1 are the main runners 5. These runners 5 are straight from end to end and arranged in parallelism and preferably positioned at equal distances at opposite sides of the transverse center of the plate B. These runners 5 are also in relatively close proximity and preferably spaced apart a distance not in excess of four inches.

The plate B at opposite sides of the runners 5 has pressed outwardly therefrom the longitudinally curved runner guides 6 preferably substantially V-shaped in cross section. The runner guides 6 at each side of the runners 5 are successively on increasing curvatures so that when body weight on the top or seat T is shifted to tilt the sled to one side these guides are brought into use and the sled will turn according to the curvature of the runner guide in contact. In other words, the successive curvatures of these runner guides are such that the further the sled is tilted to one side the sharper the turn. The runners 5 are relatively heavy to assure added wear and long service.

From the foregoing description it is thought to be obvious that a sport sled constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

It is believed to be obvious that in making the sled of a size particularly adapted for use by children, the cleats or sills 4 may be omitted as the formation of the body B will assure sufficient rigidity. The top or seat T can be secured to the body B in any desired manner as, for example, to the saddle members 3.

We claim:—

1. A sport sled comprising a body having its under surface transversely curved from one end to the other to allow said body to have lateral rocking movement, runners extending along the under surface of the body at the transverse central portion thereof, and runner guides extending outwardly from the under surface of the body at opposite sides of the runners, the guides at each side of the runners being successively of different curvatures, said runner guides being made effective upon rocking of the body transversely in either direction.

2. A sport sled comprising a body having its under surface transversely curved from one end to the other to allow said body to have lateral rocking movement, runners extending along the under surface of the body at the transverse central portion thereof, and runner guides extending outwardly from the under surface of the body at opposite sides of the runners, the guides at each side of the runners being successively of different curvatures, said runner guides being made effective upon rocking of the body transversely in either direction, the forward end portion of the body having its under surface upwardly and longitudinally curved.

3. A sport sled comprising a body having its under surface transversely curved from one end to the other to allow said body to have lateral rocking movement, runners extending along the under surface of the body at the transverse central portion thereof, runner guides extending outwardly from the under surface of the body at opposite sides of the runners, the guides at each side of the runners being successively of different curvatures, said runner guides being made effective upon rocking of the body transversely in either direction, and a top member mounted upon the body.

4. A sport sled comprising a body having its under surface transversely curved from one end to the other to allow said body to have lateral rocking movement, runners extending along the under surface of the body at the transverse central portion thereof, runner guides extending outwardly from the under surface of the body at opposite sides of the runners, the guides at each side of the runners being successively of different curvatures, said runner guides being made effective upon rocking of the body transversely in either direction, and a top member mounted upon the body, said top member being in close proximity to the body to provide a low center of gravity.

5. A sled of the class described comprising a bottom plate having its under surface transversely curved to allow said bottom plate to have transverse rocking movement, the marginal portions of the plate being returned, said returned portions at longitudinally spaced points therealong being formed to provide saddles, cross sills extending transversely of the plate and having their extremities engaged within the saddles, and a top mounted upon the cross sills.

WILLIAM J. NELSON.
ELMER A. LEIDING.